United States Patent [19]

Counts et al.

[11] 4,456,419
[45] Jun. 26, 1984

[54] CONVEYOR UNLOADING APPARATUS

[76] Inventors: Lowell R. Counts, 1634 Echo Dr., Kingsport, Tenn. 37665; L. Victor McFall, P.O. Box 769, Clintwood, Va. 24228

[21] Appl. No.: 332,244

[22] Filed: Dec. 18, 1981

[51] Int. Cl.³ .................. B65G 67/08; B65G 47/76
[52] U.S. Cl. .................................. 414/398; 198/637
[58] Field of Search ............... 414/304, 325, 339, 337, 414/395, 397, 398, 400, 402; 198/633, 635, 637

[56] References Cited

U.S. PATENT DOCUMENTS

| | | | |
|---|---|---|---|
| 1,818,427 | 8/1931 | Paisley | 198/637 |
| 2,794,561 | 6/1957 | Brahmsiepe | 414/325 |
| 3,077,995 | 2/1963 | Booth et al. | 414/304 |
| 3,476,272 | 11/1969 | Puta | 414/325 X |

Primary Examiner—Robert G. Sheridan

[57] ABSTRACT

Improved apparatus for conveying free-flowing material such as coal, ore lumps, and the like from a source to a railroad car loading station or the like, and for unloading the material from the conveyor into the cars without the need for moving the cars regardless of the number of cars at the station. The apparatus comprises gantry means, arm means mounted on and extending from said gantry means, sweep means pivotally mounted on the arm means, and power means for controlling the pivoting and positioning of the sweep means relative to a conveying means.

8 Claims, 4 Drawing Figures

CONVEYOR UNLOADING APPARATUS

This invention concerns improved means for conveying free-flowing material such as coal, ore limps, and the like from a source to a car loading station such as a railroad side track, and for unloading the material from the conveyor into the cars without the need for moving the cars regardless of the number thereof at the station.

In typical coal or ore mining operations, a railroad side track or spur line extends close to the mine exit where an overhead loading device dumps the mined material into railroad cars positioned one at a time underneath the device. Such loading devices are generally quite massive and constructed to remain stationary while the cars are moved along the side track to their loading positions thereunder. Consequently, the side track must necessarily be quite long in most instances to be effective; otherwise, only a portion of the total number of cars could be brought to their loading positions. Such side track length is not typically available, however, in many mining locations where rough terrain provides only a very limited amount of flat surface for the track.

Objects, therefore, of the present invention are: to provide a loading system which can load all cars extending the full length of the side track; and to eliminate the need for moving each car progressively under a loading device.

These and other objects hereinafter appearing have been achieved in accordance with the present invention through the discovery of unique apparatus for unloading substantially free-flowing lumps of material such as coal and the like from conveyors and other such material handling equipment, said apparatus comprising gantry means, arm means mounted on and extending from said gantry means, sweep means pivotally mounted on said arm means, and means for controlling the pivoting and position of said sweep means relative to a conveying means.

In more specific embodiments of the invention, (1) the arm means is movably mounted on said gantry means to vary the position of the sweep means with respect to the conveying means; (2) the arm means comprises multiple arms spaced apart substantially along the axis of travel of the gantry means, and wherein sweep means is mounted on each of the arms; and (3) wherein the sweep means comprises a pair of back-to-back sweeps each of which is independently pivotally mounted as aforesaid.

The invention will be further understood from the following description and drawings wherein.

Figure 1:
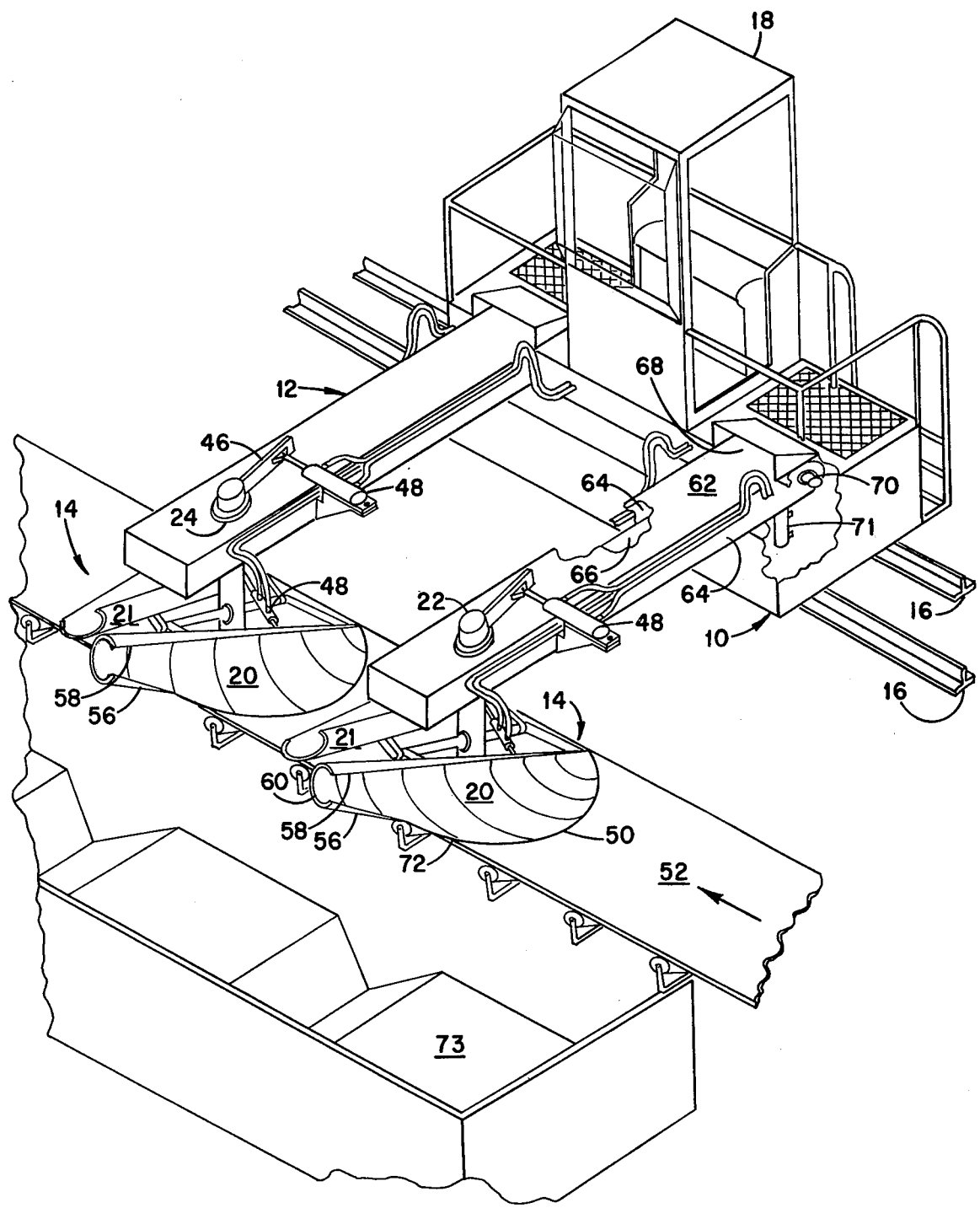
FIG. 1 is an isometric view of the double arm embodiment of the apparatus.

Referring to the drawings, particularly FIG. 1, the apparatus comprises gantry means generally designated 10, arm means generally disignated 12, and sweep means generally designated 14. The gantry means is preferably of the type which is self propelled on tracks 16 either by remote control or by an operator stationed thereon as in cab 18, and is described in more detail below.

Figure 4:
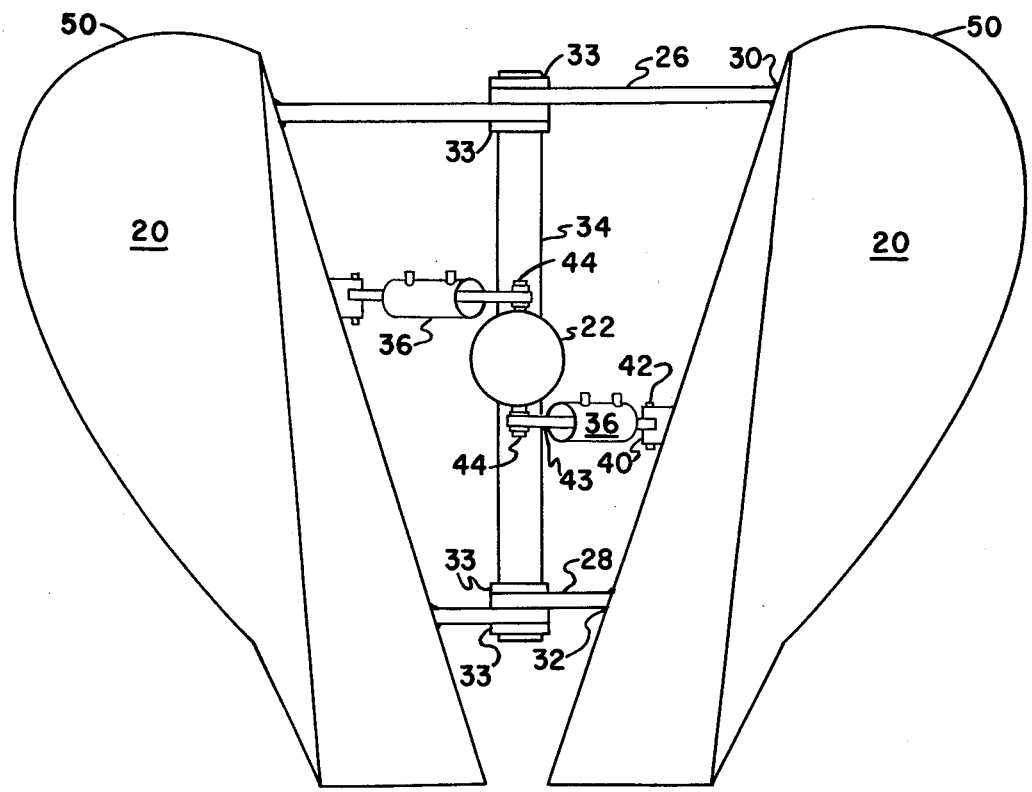
FIG. 4 is a top view of the sweep means.

Each arm 12, also defined in more detail below, supports at least one sweep means 14 at its outer end having at least one sweep 20 or 21. The sweep means 14 comprises a main shaft 22 rotatably mounted in arm 12 and vertically positioned therein by collars 24 secured to said shaft, at least one sweep 20 or 21 secured to pivot members 26 and 28, as shown in FIG. 4, preferably by welding at 30 and 32 respectively, said pivot members being pivotally mounted on shaft 34 extending through and fixed in a generally horizontal, but slightly inclined manner in main shaft 22 and held in position by collars 33. A servo mechanism of any type such as double acting hydraulic cylinder or solenoid 36 is employed to position the sweep with respect to the conveyor. In the embodiment shown, the cylinder is pivotally connected at its shaft 38 to the sweep by means of journal 40 fixed on the sweep, and pin 42, and also is pivotally connected at its body end 43 to a shaft 44 fixed to and extending outwardly from main shaft 22. A control arm 46 is fixed to the upper end of shaft 22 and also to a pivotally mounted servo mechanism such as a double acting hydraulic cylinder or solenoid 48 and can pivot the sweep means in response to the servo mechanism.

Figure 2:
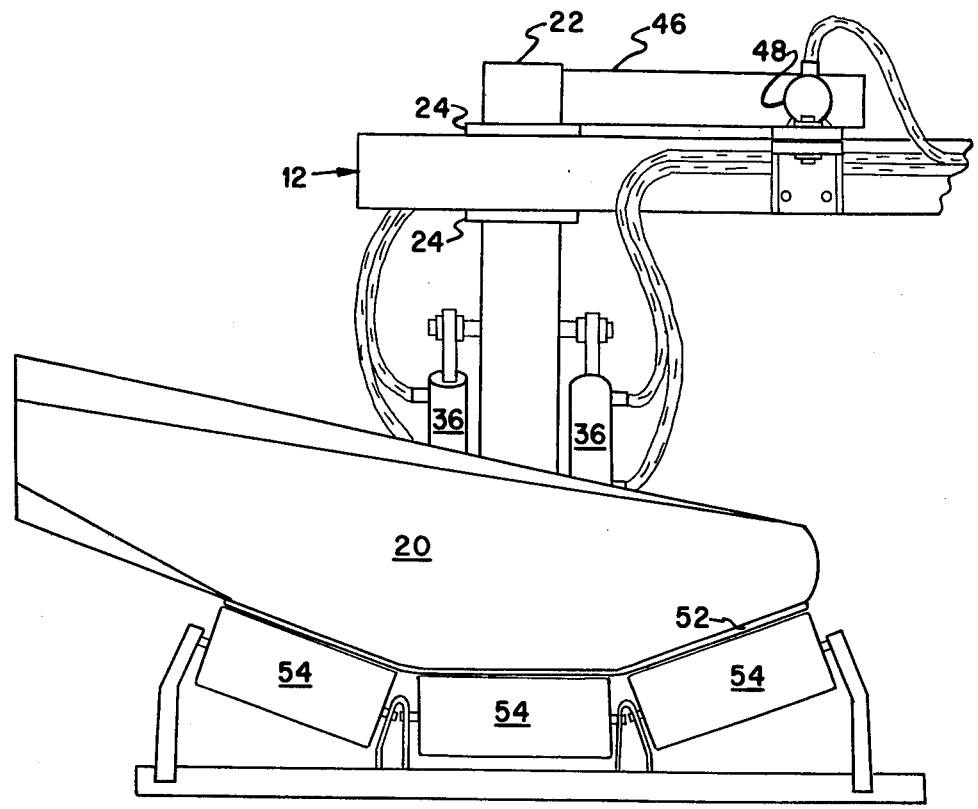
FIG. 2 is a view of a typical conveyor belt troughing idler with a sweep in place.
Figure 3:
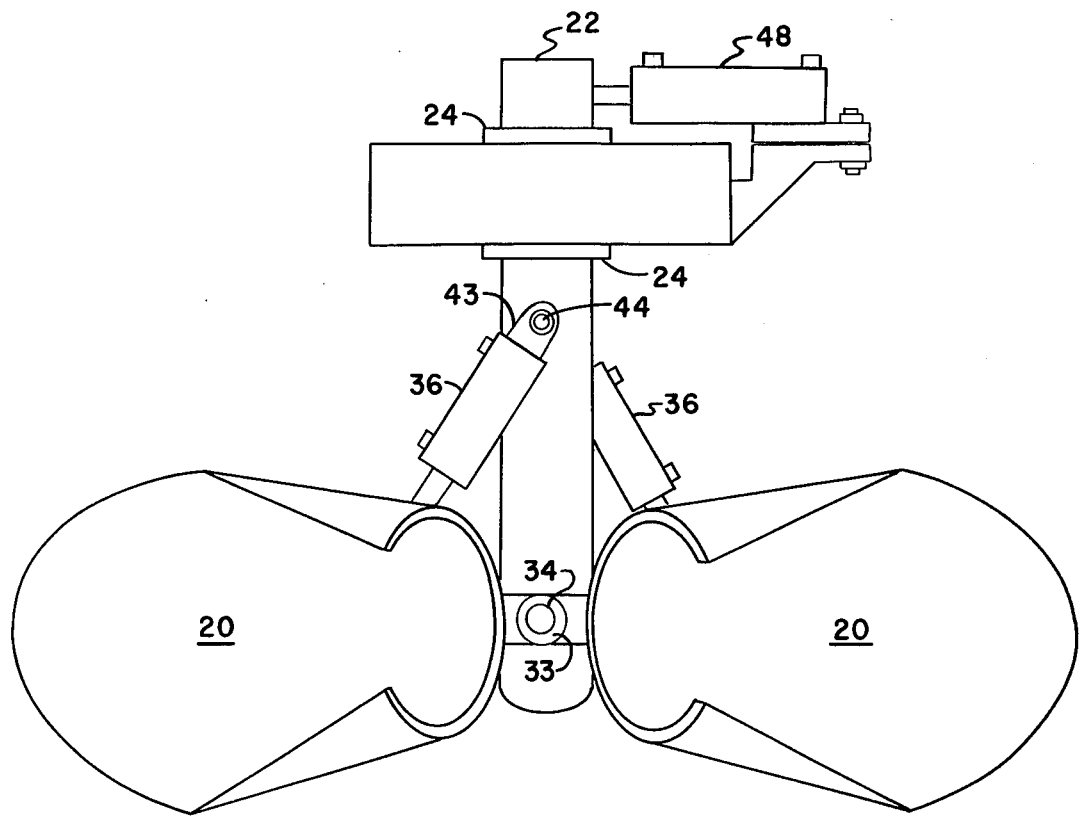
FIG. 3 is an outlet end view of the sweep means.

The sweeps 20 have a generally convex leading edge 50 which is shaped to conform generally to a typical endless conveyor belt 52 as shown in FIG. 2, which has a generally concave configuration due to the posture of the idler rollers 54. As explained in further detail below, the angle which this leading edge of the sweep makes with the conveyor belt can be adjusted as needed by means of the unique construction described above. In the construction of sweeps 20 and 21, the leading edge 50 is integral with a chute portion 56 extending inwardly from said edge and formed into a suitable curved shape to provide an upper, overhanging lip 58 to apply downward force to the material and assist in forcing it through the outlet end 60 of the sweep.

Describing arms 12 in more detail, they are preferably formed of welded sections, such as top 62, sides 64, and bottom 66, to form a rectangular cross-section of great strength. The inner end 68 of the arm is preferably pivotally mounted on a shaft 70 and is movable thereabout by suitable means such as hydraulic cylinder 71, electrically operated rack and pinion means, or the like, in response to remote control means as is well known in the art.

In the operation of the apparatus, the railroad or other cars are simply parked on a side track or otherwise such that the edge 72 of the conveyor overlies the open bodies 73 of the cars. The gantry 10 is movable on tracks 16 running substantially parallel to the side track for a sufficient distance to accommodate as many cars as desirable. When loading, the gantry simply moves to the desired car before or after the conveyor 52 is placed in operation to pick up the material from the source and transport it to a position overlying the cars. The sweeps are then brought by the operator to the desired unloading station and the position and angle of edge 50 adjusted with respect to the conveyor by means of units 36 and 48 to give proper sweeping action to the material. It is particularly noted that proper orientation of the sweep about its pivot axis 34 will conform leading edge 50 to the belt concavity which gives the most efficient pick-up, while the proper orientation of the sweep about its axis 22 will insure that the material can slide along and exit the sweep in an efficient manner to direct the material into the cars. With the present apparatus, as shown in FIG. 1, the conveyor can be run in either direction. Moreover, with the dual sweep system shown, two loading locations in the car can be achieved simultaneoulsy by raising the reverse sweeps 21 to clear the material completely, and raising the leading one of the sweeps 20 to clear about one-half of the conveyed material while positioning the trailing sweep at its low position with respect to the conveyor.

The invention has been described in detail with particular reference to preferred embodiments thereof, but it will be understood that variations and modifications can be effected within the spirit and scope of the invention.

We claim:

1. Apparatus for unloading substantially free-flowing lumps of material such as coal and the like from conveying means onto railroad cars positioned below said conveying means, said apparatus comprising gantry means adapted to move lengthwise of said cars and said conveying means, arm means mounted on and extending from said gantry means, shaft means pivotally mounted on said arm means, sweep means pivotally mounted on said shaft means and overlying said conveying means, and control means for regulating the pivoting and position of said sweep means with respect to the arm means, shaft means and conveying means for directing said material into said cars in a progressive manner lengthwise thereof.

2. The apparatus of claim 1 wherein said arm means is movably mounted on said gantry means to adjust the position of said sweep means relative to the conveying means.

3. The apparatus of claim 1 wherein said arm means comprises multiple arms spaced apart substantially along the axis of travel of said gantry means.

4. The apparatus of claim 1 wherein said sweep means comprises a pair of back-to-back sweeps each of which is independently pivotally mounted on said shaft means.

5. The apparatus of claim 1 wherein said gantry means is provided with wheels which are mounted on tracks.

6. The apparatus of claim 5 wherein said wheels are driven by electric motor means operable by remote control.

7. The apparatus of claim 2 wherein the control means for the sweep means comprises hydraulic cylinders.

8. The apparatus of claim 1 wherein the pivotal axis of said shaft means on said arm means is substantially vertical, and the pivotal axis of said sweep means on said shaft means is generally horizontal.

* * * * *